(12) United States Patent
Lee et al.

(10) Patent No.: US 7,912,508 B2
(45) Date of Patent: Mar. 22, 2011

(54) WIRELESS COMMUNICATION DEVICE WITH ADDITIONAL INPUT OR OUTPUT DEVICE

(75) Inventors: Sang Soo Lee, Gyeonggi-do (KR); Kio Lee, Seoul (KR)

(73) Assignee: Motorola Mobility, Inc., Libertyville, IL (US)

( * ) Notice: Subject to any disclaimer, the term of this patent is extended or adjusted under 35 U.S.C. 154(b) by 1116 days.

(21) Appl. No.: 11/611,439

(22) Filed: Dec. 15, 2006

(65) Prior Publication Data

US 2008/0146285 A1   Jun. 19, 2008

(51) Int. Cl.
*H04B 1/38* (2006.01)
*H04M 1/00* (2006.01)

(52) U.S. Cl. .................................. 455/566; 455/575.1

(58) Field of Classification Search .................. 455/566, 455/575.1–575.4; 345/1.1–3.4; 472/133; 463/1, 30; D14/138 G, 203.7, 191
See application file for complete search history.

(56) References Cited

U.S. PATENT DOCUMENTS

| | | | |
|---|---|---|---|
| 643,569 A1 | 8/2002 | Till | |
| 6,577,496 B1 * | 6/2003 | Gioscia et al. | 361/679.3 |
| 2001/0008074 A1 * | 7/2001 | Radley-Smith | 63/3 |
| 2002/0086711 A1 | 7/2002 | Flannery | |
| 2002/0090980 A1 | 7/2002 | Wilcox et al. | |
| 2003/0156074 A1 | 8/2003 | Ranganathan et al. | |
| 2003/0222833 A1 * | 12/2003 | Nakai | 345/1.1 |
| 2004/0127270 A1 * | 7/2004 | Wulff et al. | 455/575.4 |
| 2004/0264173 A1 * | 12/2004 | Vanderschuit | 362/103 |
| 2005/0024341 A1 * | 2/2005 | Gillespie et al. | 345/173 |

FOREIGN PATENT DOCUMENTS

| | | |
|---|---|---|
| EP | 1220515 A2 | 7/2002 |
| EP | 1367801 A2 | 12/2003 |
| JP | 11074953 | 3/1999 |
| JP | 11074953 A * | 3/1999 |

OTHER PUBLICATIONS

International Application No. PCT/US2007/081582; PCT Notification of Transmittal of the International Search Report and the Written Opinion of the International Searching Authority; dated May 2, 2008; 15 pages.

* cited by examiner

*Primary Examiner* — Lester Kincaid
*Assistant Examiner* — Daniel Lai

(57) ABSTRACT

A wireless communication device, such as a cellular telephone 2, and a method of displaying information on such a device are disclosed. In at least one embodiment, the wireless communication device includes a primary exterior surface 6 having first and second dimensions 26, 28, and first and second secondary exterior surfaces 14, 16, 18, 20 each having at least one respective dimension 24 that is substantially less than each of the first and second dimensions. The first and second secondary exterior surfaces 14, 16, 18, 20 are substantially non-coplanar relative to one another and with respect to the primary exterior surface 6, and each of the first and second secondary exterior surfaces includes a respective display portion 8. In at least some additional embodiments, the display portions 8 are capable of displaying information 40 in a streaming manner, and/or capable of accepting input commands from an operator 42 when the operator touches the display portions.

14 Claims, 4 Drawing Sheets

WIRELESS COMMUNICATION DEVICE WITH ADDITIONAL INPUT OR OUTPUT DEVICE

FIELD OF THE INVENTION

The present invention relates to features implemented on wireless communication devices such as cellular telephones.

BACKGROUND OF THE INVENTION

Wireless communication devices such as cellular telephones, pagers, personal digital assistants, other handheld devices, and other devices are ubiquitous in the modern world. Such communication devices typically have one or more human-machine interfaces, such as LCD screens on which are displayed images, and one or more buttons by which operators can enter commands. In some cases, a touch-sensitive panel (or even touchscreen) can be employed in order to allow an operator to provide commands by contacting one or more regions of the panel, which may or may not be configured to resemble buttons.

While conventional wireless communication devices are equipped with a variety of human-machine interfaces that are relatively inexpensive, relatively easy to use and/or capable of displaying a variety of types of information, there is a continuing need for wireless communication devices having human-machine interfaces with additional or improved features. In particular, while cellular telephones typically have one or more display screens that can be viewed by an operator, depending upon the position of the operator relative to the display screens, these display screens are not always easy to view. Further, although such display screens can be configured in various manners to enhance the viewing of particular types of information on those display screens, there are many circumstances in which the manner of display still does not best facilitate the communication of information to a viewer.

For example, with respect to a clamshell type cellular telephone, the display screen is often located on an inner surface of the phone, such that the display may be concealed when the two halves of the phone are closed to be in contact with one another. Also for example, with respect to candy bar type cellular telephone having a display screen positioned along one of its primary outer surfaces (that is, those of the exterior, typically planar surfaces of the phone having the largest surface area), the display screen may become difficult to view depending upon the position of the viewer relative to the phone (e.g., if the viewer is looking at the phone from the side of the phone).

It would therefore be advantageous if improved human-machine interfaces could be developed for implementation on cellular telephones and/or other wireless communication devices.

BRIEF SUMMARY OF THE INVENTION

In at least some embodiments, the present invention relates to a wireless communication device. The wireless communication device includes a primary exterior surface having first and second dimensions, and first and second secondary exterior surfaces each having at least one respective dimension that is substantially less than each of the first and second dimensions. The first and second secondary exterior surfaces are substantially non-coplanar relative to one another and with respect to the primary exterior surface, and each of the first and second secondary exterior surfaces includes a respective display portion.

Additionally, in at least some embodiments, the present invention relates to a cellular telephone. The cellular telephone includes a front surface having first and second dimensions, and a plurality of edge surfaces each having at least one respective dimension that is substantially less than each of the first and second dimensions. At least two of the edge surfaces include means for displaying information.

Further, in at least some embodiments, the present invention relates to a method of displaying information on a cellular telephone. The method includes providing a display structure along first and second edge portions of the cellular telephone, the first and second edge portions being non-coplanar with respect to one another. The method additionally includes receiving at least one signal pertaining to at least one of an incoming call, a voicemail message, a text message and a command to play an audio recording. The method also includes displaying information on the display structure relating to the at least one signal.

DETAILED DESCRIPTION OF THE INVENTION

Figures 1A, 1B, 1C, 2A, 2B, 2C:
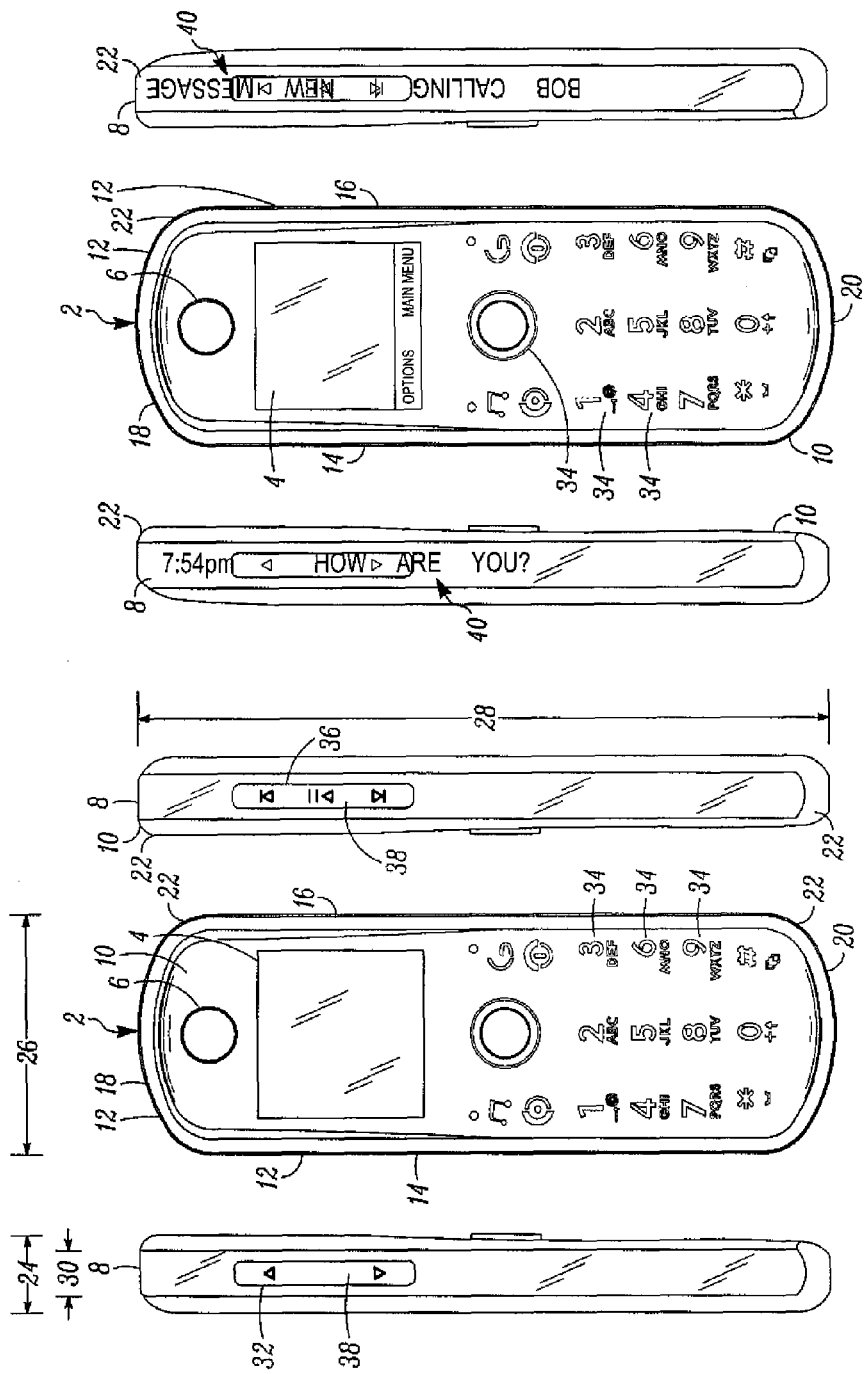
FIGS. 1A, 1B and 1C respectively are front, left side and right side elevation views of an exemplary wireless communication device having an additional human-machine interface positioned along side/end edge surfaces of the wireless communication device when operating in a first mode of operation, in accordance with at least one embodiment of the present invention.
FIGS. 2A, 2B and 2C respectively are front, left side and right side elevation views of the exemplary wireless communication device of FIGS. 1A-1C, when operating in a second mode of operation, in accordance with at least one embodiment of the present invention.

Referring to FIGS. 1A-1C and 2A-2C, the present invention relates to wireless communication devices, for example, a cellular telephone 2. As shown, the cellular telephone 2 in the present embodiment is a candy bar type cellular telephone, although in alternate embodiments, the cellular telephone can instead be a clamshell type cellular telephone having upper and lower halves that are hingedly coupled to one another, or another type of cellular telephone (e.g., a slider type phone). FIGS. 1A and 2A respectively provide front elevation views of the cellular telephone 2 when operating in first and second modes, respectively, which in the present embodiment are an idle mode and a flowing short message service (SMS)/call information mode. FIGS. 1B and 2B respectively show left side elevation views of the cellular telephone 2 when operating in the first and second modes, respectively, while FIGS. 1C and 2C respectively show right and left side elevation views of the cellular telephone 2 when operating in the first and second modes, respectively.

Figure 6:
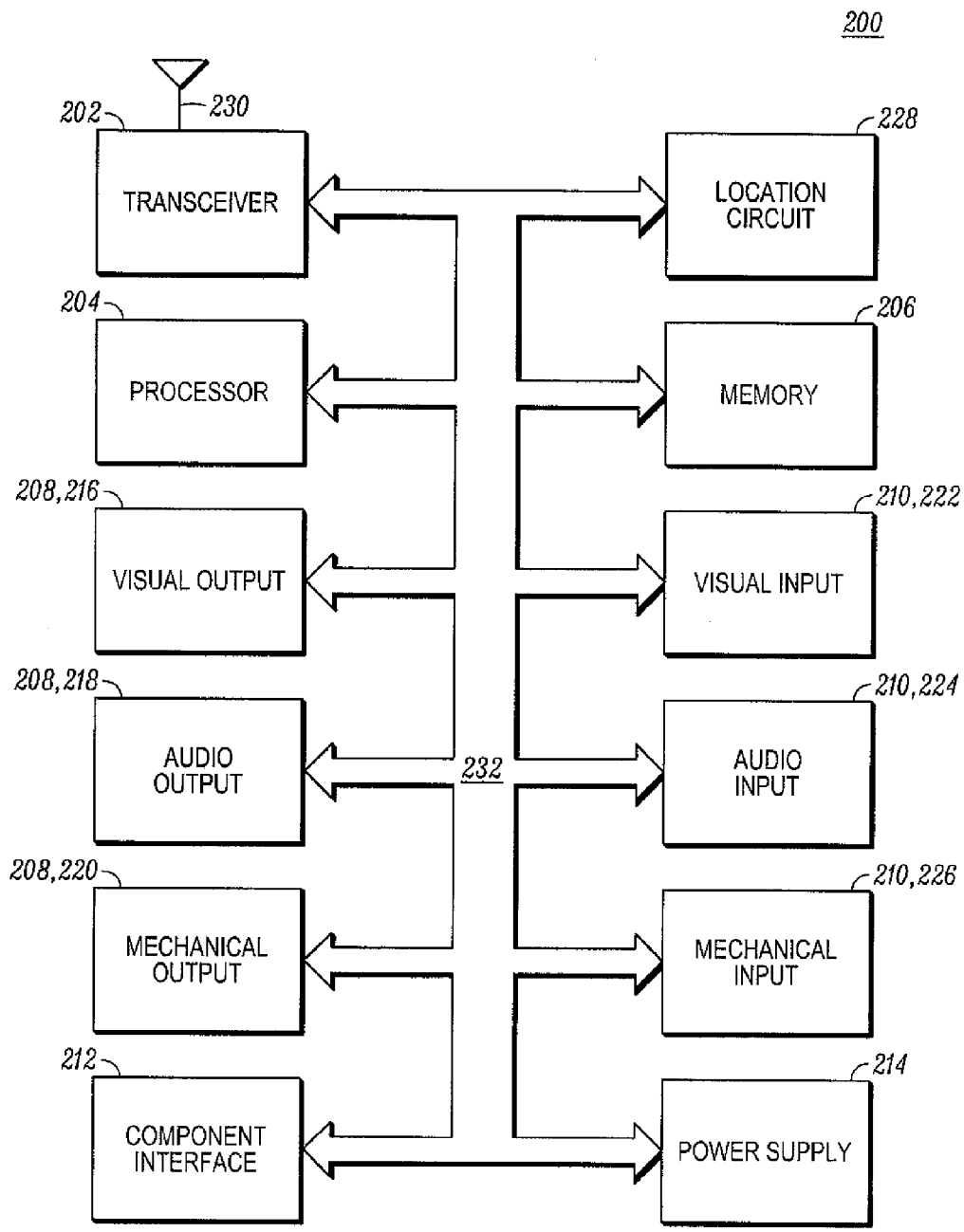
FIG. 6 is a block diagram showing exemplary internal components of the wireless communication device of FIGS. 1A-5.

Referring additionally to FIG. 6, the cellular telephone 2 of FIGS. 1A-2C in at least the present embodiment includes various internal components 200 as shown in block diagram form. Although particularly intended to be representative of the internal components of the cellular telephone 2, the block diagram of FIG. 6 is also representative of the internal components of other cellular telephones, as well as other wireless or mobile communication devices, for example, personal digital assistants or other handheld devices, or even personal computers capable of wireless communications, embodiments of which are also intended to be encompassed by the present invention. Also, while FIG. 6 shows the internal components 200, it should further be understood that these components are only intended to be exemplary and that the present invention is intended to encompass a wide variety of wireless communication devices that include other components in addition to those shown, and/or fail to include one or more of the components shown.

In the present embodiment, the internal components 200 include one (or possibly more than one) wireless transceiver 202, a processor 204, a memory portion 206, one or more output devices 208, and one or more input devices 210. The processor 204 can be any of a variety of different processing devices including, for example, a microprocessor. The transceiver 202 can be understood to include various transceiver circuitry as well as an antenna 230, and typically employs wireless technology for communication, such as code division multiple access (CDMA) technology, BlueTooth technology, etc. In at least some embodiments, the antenna 230 can be representative of multiple antennas, which can collectively form an antenna array.

As shown in FIG. 6, the internal components 200 can further include a component interface 212 to provide a direct connection to auxiliary components or accessories for additional or enhanced functionality. The internal components 200 also include a power supply 214, such as a battery, for providing power to the other internal components while enabling the overall cellular telephone 2 to be portable. Additionally, the internal components 200 can also include a location circuit 228. Examples of the location circuit 228 include, but are not limited to, a Global Positioning System (GPS) receiver, a triangulation receiver, an accelerometer, a gyroscope, or any other information-collecting device that can identify a current location of the cellular telephone (or one or more of its internal components 200). The various internal component 202-230 shown in FIG. 6 are all supported, directly or indirectly, by a housing 10 (see FIGS. 1A-2C) of the cellular telephone 2, and are in communication with one another, directly or indirectly, by way of one or more communication linkages, networks, or buses represented by a link 232 of FIG. 6.

The memory portion 206 of the internal components 200 can include any number of a variety of different types of memory devices such as random access memory (RAM) devices, read only memory (ROM) devices, optical memory devices, subscriber identity module memory devices, or any of a variety of other types of memory devices that can be used to store and/or retrieve information. Typically, although not necessarily, operation of the memory portion 206 in storing and retrieving information is governed by commands from the processor 204. The information that is stored by the memory portion 206 can include, but need not be limited to, operating systems (or other systems software), applications, and data. Each operating system in particular includes executable code that controls basic functions of the cellular telephone 2, such as interaction among the various internal components 200, communication with external devices via the transceiver 202 and/or the component interface 212, and storage and retrieval of applications and data to and from the memory portion 206.

As for the applications, each application includes executable code that operates in conjunction with the operating system to provide more specific functionality for the cellular telephone 2, such as file system service and handling of protected and unprotected data stored in the memory portion 206. Exemplary applications can include, for example, a discovery application for discovering media on behalf of a user and his/her phone and a download user agent responsible for downloading the media object described by the download descriptor. As for the data, data is non-executable code or information that can be referenced and/or manipulated by an operating system or application for performing functions of the cellular telephone 2.

The internal components 200 can operate in conjunction with one another to perform a number of functions. For example, upon reception of wireless signals by way of the antenna 230, the transceiver 202 demodulates the communication signals to recover incoming information, such as voice data and/or other data, transmitted by the wireless signals. After receiving the incoming information from the transceiver 202, the processor 204 formats the incoming information for the one or more output devices 208. Similarly, for transmission of wireless signals, the processor 204 formats outgoing information, which can (but need not) be activated by the input devices 210, and conveys the outgoing information to the transceiver 202 for modulation to communication signals. The transceiver 202 by way of the antenna 230 conveys the modulated signals to any of a variety of devices including, for example, devices that are relatively far away such as a cell tower or to devices that can be closer, such as an access point or a BlueTooth headset.

The output and input devices 208, 210 of the internal components 200 can include a variety of types of devices depending upon the embodiment. The output devices 208 in particular can include one or more visual output devices 216, one or more audio output devices 218, and/or one or more mechanical output devices 220. Likewise, the input devices 210 can include one or more visual input devices 222, one or more audio input devices 224, and/or one or more mechanical input devices 226. More particularly, the visual output devices 216 can include a variety of types of devices such as, for example, a liquid crystal display (LCD), a light emitting diode (LED) display, a plasma display, or a light emitting diode indicator. Likewise, the audio output devices 218 can take a variety of forms such as a speaker, alarm and/or buzzer, and the mechanical output devices 220 can take various forms including, for example, a vibrating mechanism.

With respect to the input devices 210, the mechanical input devices 226 can include various structures such as a touch panel, a flip sensor, a keyboard or keypad, one or more individual selection buttons (in association with or separate from a keypad or touch panel), a mouse, a joystick, a capacitive sensor, a motion sensor, a switch, or any other device useful for providing an interface between a user and an electronic device. Further, the visual input devices 222 can include, for example, an optical sensor or camera, and the audio input devices 224 can include, for example, a microphone or transducer. In at least some embodiments, one or more of the different types of output and/or input devices 208, 210 (or portions thereof) are integrated into a single input/output device, e.g., a touchscreen. Actions capable of actuating one or more of the input devices 210 can include, but are not limited to, pressing a button on the device (e.g., pressing a button or region of a touch panel or keyboard), opening or closing of the cellular telephone 2 (e.g., particularly when it is a clamshell type phone), unlocking the phone, moving the phone (or a portion of the phone) to actuate a motion, moving the phone to actuate a location positioning system, and otherwise operating the phone.

Referring still to FIG. 6 as well as to FIGS. 1A-2C, in the present embodiment the visual output devices 216 include both a primary display 4 that is provided along a front surface 6 of the cellular telephone, as well as a secondary display 8 that is positioned along edge surfaces 12 of the cellular telephone. As shown in FIGS. 1A and 2A, the primary display 4 is a square or rectangular display that can take a conventional form, such as an LCD display as mentioned above. In contrast to conventional embodiments, the secondary display (or possibly multiple such displays) 8 positioned along the edge surfaces 12 of the cellular telephone 2 takes the form of a band or strip having a relatively narrow width such that it comports with the relative thinness of the cellular telephone 2 and its narrow edge surfaces 12.

In the present embodiment, the secondary display 8 is a band that extends around the entire perimeter of the phone, thus extending along left and right side edge surfaces 14 and 16, respectively, along upper and lower end edge surfaces 18 and 20, respectively, and around corners 22 linking the side and the end edge surfaces. To achieve this shape, in at least some embodiments, the secondary display 8 is a flexible structure capable of wrapping continuously around the edge surfaces of the cellular telephone 2. In at least some such embodiments, the secondary display 8 in particular employs E INK technology (available from E Ink Corporation of Cambridge, Mass.) or cholesteric liquid crystal display (ChLCD) technology. As will be described in further detail below, a variety of alphanumeric, graphical and other information, including graphic images, can be displayed by the secondary display 8 depending upon the embodiment, operational circumstances, and/or mode of operation of the cellular telephone 2.

In alternate embodiments, the secondary display (or displays) 8 can take a variety of forms other than that of the present embodiment. For example, the secondary display 8 can have a U-shape where the secondary display extends along each of the side edge surfaces 14 and 16, the upper end edge surface 18 and the corners 22 linking those edge surfaces, but not along the lower end edge surface 20. In further embodiments, the secondary display 8 can have a L-shape such that it extends along one of the two side edge surfaces 14, 16, and one of the end edge surfaces 18, 20 (as well as the corner linking those two edge surfaces), but not the other side and end edge surfaces. Alternatively two such L-shaped secondary displays that are not linked to one another can also be provided. Also, in some embodiments, the secondary display 8 does not continuously extend between adjacent side and end edge surfaces but rather includes several separate sections (e.g., there are multiple displays) that are respectively positioned on different side or end edge surfaces, or possibly only along the corners. In further embodiments, multiple discrete secondary displays that are separated from one another can be provided along a single edge surface, such as along the side edge surface 14. Additionally, it is possible that in some alternate embodiments the primary and secondary displays 4, 8 would be continuously formed as a single display.

Indeed, the present invention is intended to encompass any of a variety of cellular telephones or other wireless communication devices having one or more display components that are positioned along one or more edge surfaces of the telephone/wireless communication device, regardless of the number or type of display components provided on the primary (e.g., front or rear) surfaces of the device. More particularly, the present invention is at least in some embodiments intended to encompass any cellular telephone or other wireless communication device that having one or more displays positioned along one or more surfaces of the telephone/device that have one or more dimensions that are substantially lesser in their extent than both of the dimensions of the primary surface(s) of the telephone/device. Thus, the present invention is intended to encompass the embodiment of FIGS. 1A-2C since a width 24 of the edge surfaces 12 of the cellular telephone 2 (e.g., the thickness/depth of the cellular telephone) is substantially less in its extent that either a width 26 or a length 28 of the front surface 6 (or rear surface) of the phone, as shown particularly in FIGS. 1A-1C. Further, it should also be noted that a width 30 of the secondary display 8 need not equal the width 24 of the edge surfaces 12, and often will be less than the width of the edge surfaces (or thickness of the phone) as shown in FIG. 1B, albeit in some embodiments the two widths are the same. In any event, the width of the secondary display typically will not exceed the thickness of the phone.

Referring still to FIGS. 1A-2C, the cellular telephone 2 in the present embodiment not only includes both the primary and secondary displays 4 and 8, respectively, but also further includes several of the mechanical input devices 226 of FIG. 6. In particular, not only does the cellular telephone 2 include the primary display 4 on the front surface 6 of the phone, but also the cellular telephone includes on that front surface primary input controls 34 that include alphanumeric keys and other buttons that can be implemented by way of a touch panel or set of discrete key actuators. Additionally, in the present embodiment, the cellular telephone 2 also includes secondary input controls 38 that are positioned along the left and right side edge surfaces 14 and 16 of the phone, and that are provided by way of the secondary display 8. That is, the secondary display 8 serves as both one of the visual output devices 216 and as one of the mechanical input devices 226, and thus takes the form of a touchpad or similar structure.

Referring particularly to FIGS. 1B and 1C, the secondary input controls 38 in the present embodiment more specifically include a left side set of controls 32 as shown in FIG. 1B and a right side set of controls 36 as shown in FIG. 1C. The sets of controls 32, 36 can be displayed by the secondary display 8 as pluralities of icons or other graphic images appearing to be user-selectable buttons or similar user-selectable features. In at least some embodiments, the secondary display 8 employs capacitive sensing technology to detect when the display is being touched or pressure is being applied to the display. Upon sensing that an operator has selected one of the secondary input controls 38 by applying pressure to (or merely touching or approaching) the secondary display 8 at the location of an appropriate icon or graphical image, a signal is provided by the display back to the processor 204 (see FIG. 6) indicating the user selection. Also, in at least some embodiments, the sets of controls 32, 36 are displayed by the secondary display 8 through the use of backlighting. Although in the present embodiment the secondary input controls 38 are shown to be positioned along the left and right side edge surfaces 14, 16 of the cellular telephone 2, in alternate embodiments these input controls can be found instead on the end edge surfaces 18, 20 (as well as on the corners 22) and/or on both the side and end edge surfaces.

While FIGS. 1B-1C show the secondary display 8 to be providing the secondary input controls 38, the particular icons, graphic images, or other information that is/are displayed upon the secondary display 8 can vary depending upon the embodiment, as well as upon operational circumstances and even upon the mode of operation as discussed in more detail below. The particular icons or graphic images that are displayed as input controls in particular can take a variety of forms to allow for an operator to control a variety of operations of the cellular telephone 2 (or other wireless communication device). Depending upon the embodiment, for example, different input controls can allow an operator to determine whether the cellular telephone 2 is switched on or off, to determine output characteristics of the cellular telephone (e.g., volume, brightness, contrast, etc.), to control menu scrolling, to control the display of mp3 files or images, to control the playing of audio recordings, to control operation of a camera on the cellular telephone, etc.

As further illustrated by FIGS. 1A-2C and additionally FIGS. 3A-3B, 4A-4C and 5, the presence of the secondary display 8 on the cellular telephone 2 makes it possible for the cellular telephone to operate in a variety of manners that differ from, supplement and/or complement other operational behaviors of the phone. In particular, the secondary display 8 allows the cellular telephone 2 to operate in several different modes of operation. FIGS. 1A-1C illustrate the cellular telephone 2 to be operating in a first, idle mode of operation. In this mode of operation, as already discussed above, the secondary display 8 displays the secondary controls 38 on the side edge surfaces 14, 16 of the cellular telephone. Otherwise, the secondary display 8 is blank (or black), as is the primary display 4 in the exemplary view provided by FIG. 1A.

However, turning to FIGS. 2A-2C, when the cellular telephone 2 enters a second, flowing short message service (SMS)/call information mode, the image(s) provided by the secondary display 8 varies from that shown in FIGS. 1B-1C. More particularly, rather than displaying the secondary input controls 38, the secondary display 8 instead displays alphanumeric information 40 regarding any of a call that is being received, a text message that is being or has been received, or a voicemail message is being or has been received. The alphanumeric information 40 can be displayed in a large font format, or with all capital letters, or in another large or easily viewed format, FIGS. 2B and 2C respectively provide examples of such information, namely, with FIG. 2B providing a text message ("HOW ARE YOU?") and a time at which the text message has been received (7:54 p.m.), and with FIG. 2C displaying an indication of the identity of a party from which a telephone call is currently being received ("BOB CALLING") as well as an indication that a voicemail message has been received ("1 NEW MESSAGE").

In the present embodiment, when the cellular telephone 2 is operating in the second mode of operation, the secondary display 8 is controlled to display the alphanumeric information 40 in a "ticker tape" type format, such that the information is displayed in a moving, streaming manner along the secondary display around the edge surfaces 14, 16, 18 and 20 (and corners 22) of the cellular telephone 2. While the secondary display 8 is providing information in such a manner, the primary display 4 can be controlled to simultaneously display other information as it might normally do in conventional phones. FIG. 2A, in particular, shows that the primary display 4 can (although it need not) be displaying information at times when the secondary display 8 is displaying information in the second mode of operation. Nevertheless, there need not be any correlation between the operation of the primary display 4 and the secondary display 8. Indeed, the present invention is intended to encompass embodiments that, while having one or more display devices positioned around the edge surfaces of the overall device, do not have any display device along the primary, front or rear surfaces of the overall device.

Figure 3B:
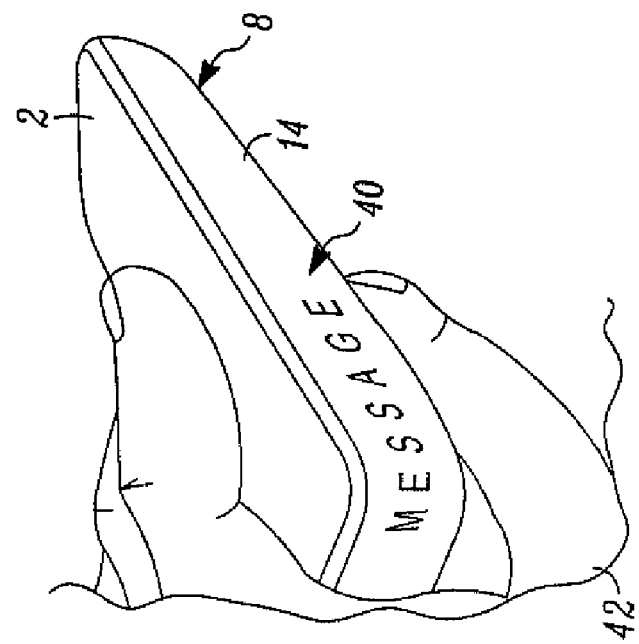
FIGS. 3A and 3B respectively are additional, first and second simplified perspective views of the wireless communication device of FIGS. 2A-2C when operating in the second mode of operation, showing how the device might appear to a viewer when held in the viewer's hand.
Figure 3A:
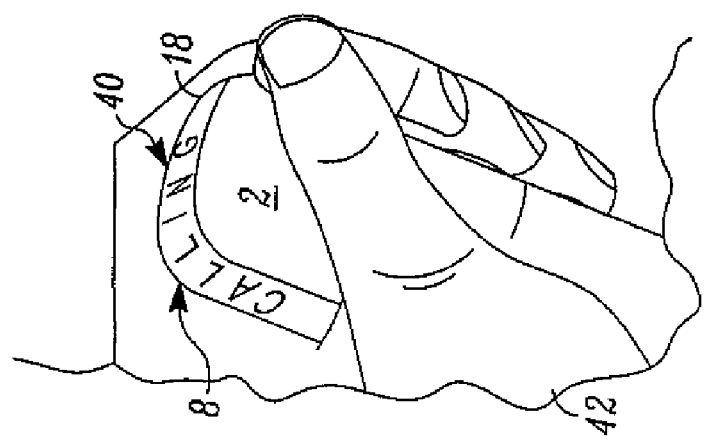

FIGS. 3A and 3B are perspective views that each illustrate how the streaming alphanumeric information 40 provided by the secondary display 8 can be easily viewed by the operator of the cellular telephone (or other viewer). FIG. 3A in particular shows how the streaming alphanumeric information 40 is particularly visible along the upper end edge surface 18 when the cellular telephone 2 is grasped within an operator's hand 42 such that the end edge surface extends outward between the thumb and index finger of the hand. FIG. 3B shows how the information 40 is also viewable by the operator, particularly along the left side edge surface 14 of the cellular telephone 2 when the phone is grasped by the hand 42 in such a manner that the phone extends lengthwise outward from the palm of the hand away from the hand between the thumb and index finger. Although the present embodiment displays the information 40 in a streaming "ticker tape" manner, in alternate embodiments this need not be the case.

Figures 4A, 4B, 4C:
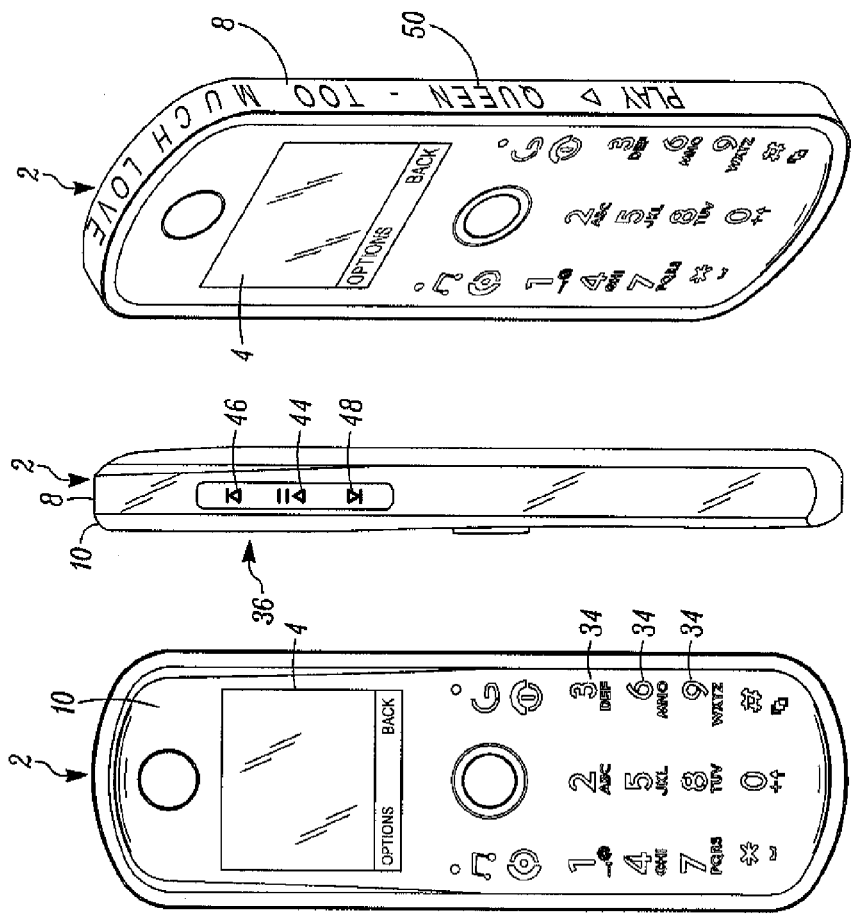
FIGS. 4A, 4B and 4C respectively are front elevation, right side elevation and perspective views of the wireless communication device of FIGS. 1A-3B, when operating in a third mode of operation, in accordance with at least one embodiment of the present invention.

Turning to FIGS. 4A-4C and 5, the cellular telephone 2 can also operate in an additional mode, namely, a "music mode." In this embodiment, as shown in FIG. 4A, the cellular telephone 2 has music information stored on it (e.g., in the memory portion 206), or is capable of accessing music information (e.g., in real time via the internet). An operator is then able to select a desired audio clip to be played by the cellular telephone 2, for example, by way of one of the audio output devices 218 of the cellular telephone itself or possibly an auxiliary device such as an earpiece that is plugged into the telephone. More particularly, the available music selections are displayed on the primary display 4, and the operation selects one of the audio clips to be played by the cellular telephone 2 by utilizing the buttons 34. Further, the operator can, by pressing an appropriate button (now shown), provide an indication that music should be downloaded.

Once a music selection has been made, the playing of the musical selection can then be controlled by the operator. As shown in FIG. 4B, upon entering the music mode the controls 36 are provided by the secondary display 8 along the right side edge surface 16 of the cellular telephone. The controls 36 in the present embodiment include a play/pause button/icon 44, a fast-forward button/icon 46, and a reverse button/icon 48, and allow the operator to control the playing of the musical selection by touching/pressing the appropriate buttons/icons on the secondary display 8. In at least some further embodiments, the controls 36 can include also (or instead) other buttons such as volume control buttons and/or a stop button. Typically, an operator is also able to provide commands to control the playing of the musical selection by way of the controls 34 on the front surface 6 in addition to the controls 36 on the secondary display 8. However, the controls 36 due to their positioning on the telephone 2 can facilitate the entry of such commands.

Figure 5:
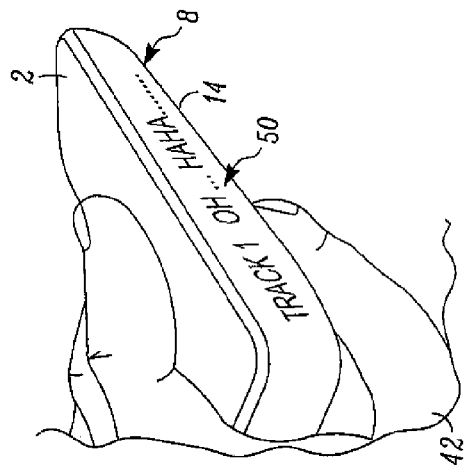
FIG. 5 is an additional perspective view of the wireless communication device of FIGS. 4A-4C when operating in the third mode of operation, showing how the device might appear to a viewer when held in the viewer's hand.

Additionally, as illustrated by FIG. 4C, once the music is actually playing, the controls 36 are no longer displayed by the secondary display 8, but rather information 50 is displayed by the secondary display 8. The information 50 can include a variety of types of information that may be of interest to the operator. For example, in addition to indicating that a song is playing (by showing the word "PLAY"), the information 50 can also include the name of the artist performing the music ("QUEEN"), a track number and/or any relevant lyrics. As discussed above with respect to FIGS. 2B-3B, this information can be displayed in a streaming, "ticker tape", or flowing caption manner. FIG. 5 further shows how the cellular telephone 2, when operating in the flowing caption manner of 4C as grasped by the hand 42 in the same position shown in FIG. 3B, facilitates operator viewing of the information 50. In at least some alternate embodiments, the information 50 is displayed simultaneously with the controls 36, for example, with the controls being displayed in a faded manner relative to the other displayed information.

As already mentioned above, the present invention is intended to encompass a variety of wireless communication devices (not merely cellular telephones) having one or more display devices provided along one or more of the lesser or secondary (e.g., edge) surfaces of the wireless communication devices other than the primary, substantially-planar surfaces of those devices. Through the use of such display devices, embodiments of the present invention are capable of providing/displaying more information than is normally available using conventional arrangements, and/or allowing for the display of such information in a manner that is more clearly visible from a variety of perspectives, and thus enhance the degree to which an operator/user is kept apprised of relevant information.

In at least some embodiments of the present invention, through the use of the displays on the secondary surfaces to display certain information, space on the primary display(s) of the primary surface(s) of the device that would otherwise be used to display that information can instead be freed up for other purposes. Indeed, the incorporation of secondary displays on secondary surfaces of wireless communication devices in accordance with embodiments of the present invention results in more efficient use of the real estate/external surface area of those wireless communication devices, and thus can result in wireless communication devices of smaller size and lesser cost. In embodiments where the secondary displays serve both as displays and as input devices (e.g., in the music mode described above), the use of those displays can afford users with a greater degree of control over the performance of the device, and/or improve the intuitiveness with which such control can be achieved. It should further be noted that, although three modes of operation of the cellular telephone 2 are described above (idle, flowing SMS/call information and music modes) the present invention is intended to encompass a variety of modes of operation as well. For example, in one alternate embodiment, the flowing SMS/call information phone can be broken into two separate modes, one having to do with receiving telephone calls and the other having to do with receiving text messages.

It is specifically intended that the present invention not be limited to the embodiments and illustrations contained herein, but include modified forms of those embodiments including portions of the embodiments and combinations of elements of different embodiments as come within the scope of the following claims.

We claim:

1. A wireless communication device comprising:
    a primary exterior surface having first and second dimensions; and
    first, second, third, and fourth secondary exterior surfaces each having at least one respective dimension that is substantially less than each of the first and second dimensions,
    wherein the first and second secondary exterior surfaces are substantially non-coplanar relative to one another and with respect to the primary exterior surface, and
    wherein each of the first, second, third, and fourth secondary exterior surfaces includes a respective display portion,
    wherein the primary exterior surface is a front surface and the first, second, third, and fourth secondary exterior surfaces are edge surfaces,
    wherein the first and second secondary exterior surfaces are linked by a rounded corner surface,
    wherein the respective display portions of the first and second secondary exterior surfaces are each integrally coupled to a further display portion included upon the rounded corner surface, and
    wherein the respective display portions and the further display portion together form a single integrated display structure that forms a complete loop around a perimeter of the wireless communication device and that is separate from an additional display structure provided on the primary exterior surface.

2. The wireless communication device of claim 1, wherein the first secondary exterior surface is a side edge surface and the second secondary exterior surface is an end edge surface.

3. The wireless communication device of claim 1, wherein the respective display portions of the first and second secondary exterior surfaces together with the further display portion form at least part of a ticker tape style display.

4. The wireless communication device of claim 3,
    wherein the wireless communication device is either a cellular telephone or a personal digital assistant,
    wherein information displayed by the display portions streams from a first of the edge surfaces to a second of the edge surfaces, and
    wherein the ticker tape style display extends around the perimeter of the wireless communication device.

5. The wireless communication device of claim 1, wherein at least one of the respective display portions also is capable of providing signals in response to pressure applied to the respective display portion.

6. The wireless communication device of claim 5, wherein at least one of the following is true:
    at least one of the respective display portions utilizes one of an E INK technology and a cholesteric liquid crystal display (LCD) technology; and
    at least one of the respective display portions employs capacitive sensing technology.

7. A cellular telephone comprising:
    a front surface having first and second dimensions; and
    a plurality of edge surfaces including first, second, third and fourth edge surfaces, each having at least one respective dimension that is substantially less than each of the first and second dimensions,
    wherein the edge surfaces include means for displaying information, the means for displaying extending continuously along the edge surfaces so as to form a complete loop around a perimeter of the cellular telephone,
    wherein a further display is provided on the front surface, the further display being separate from the means for displaying information, and
    wherein the information displayed by the means for displaying streams from a first of the edge surfaces to a second of the edge surfaces.

8. The cellular telephone of claim 7, wherein the respective edge surfaces are substantially perpendicular relative to one another and with respect to the front surface.

9. The cellular telephone of claim 7, wherein the cellular telephone is one of a candy bar type cellular telephone, a slider type cellular telephone, and a clamshell type cellular telephone.

10. The cellular telephone of claim 7, wherein at least one of the following is true:

the means for displaying information operates to display the information in a flowing manner; and at least a portion of the means for displaying information is touch-sensitive.

11. The cellular telephone of claim 10, wherein the means for displaying information is touch-sensitive, and wherein the displayed information includes at least one icon selected from the group consisting of a volume adjustment icon, a play icon, a stop icon, a fast-forward icon, a reverse icon, an on icon, an off icon, a menu-scrolling icon, a mp3 icon, and a camera control icon.

12. The cellular telephone of claim 7, wherein the cellular telephone is capable of operating in a plurality of modes, and wherein:

when the cellular telephone is operating in a first of the modes, the information is indicative of a message received by the cellular telephone;

when the cellular telephone is operating in one of the first mode and a second of the modes, the information is indicative of an incoming call to the cellular telephone; and when the cellular telephone is operating in a third of the modes, the information is indicative of at least one of a lyric, a track and an artist identifier pertaining to a music selection.

13. A method of displaying information on a cellular telephone, the method comprising;

providing a first display structure along first, second, third and fourth edge portions of the cellular telephone, the first and second edge portions being non-coplanar with respect to one another;

providing a second display structure on a front surface extending between the first and second edge portions, the second display structure being separate from the first display structure;

receiving at least one signal pertaining to at least one of an incoming call, a voicemail message, a text message and a command to play an audio recording; and displaying information on the first display structure relating to the at least one signal, wherein the first display structure extends continuously along the edge portions so as to form a complete loop around a perimeter of the cellular telephone, and wherein the displayed information streams along the first display structure from the first edge portion to the second edge portion.

14. The method of claim 13, further comprising:

receiving an input command provided due to application of pressure to the first display structure; and providing a signal to a control device of the cellular telephone in response to the receiving of the input command.

* * * * *